(12) United States Patent
Yokoyama

(10) Patent No.: US 6,612,758 B2
(45) Date of Patent: Sep. 2, 2003

(54) PRINTING SYSTEM AND METHOD, STORAGE MEDIUM, AND IMAGE PROCESSING APPARATUS AND CONTROL METHOD THEREFOR

(75) Inventor: Tetsuya Yokoyama, Machida (JP)

(73) Assignee: Canon Kabushiki Kaisha (JP)

( * ) Notice: Subject to any disclaimer, the term of this patent is extended or adjusted under 35 U.S.C. 154(b) by 48 days.

(21) Appl. No.: 09/880,523

(22) Filed: Jun. 13, 2001

(65) Prior Publication Data
US 2001/0051064 A1 Dec. 13, 2001

(30) Foreign Application Priority Data
Jun. 13, 2000 (JP) .................................. 2000-177516

(51) Int. Cl.[7] .................................................. B41J 3/42
(52) U.S. Cl. ...................................... 400/70; 400/61
(58) Field of Search ........................... 400/70, 61, 73, 400/76; 709/100–104

(56) References Cited

U.S. PATENT DOCUMENTS

| | | | | | |
|---|---|---|---|---|---|
| 5,805,777 A | * | 9/1998 | Kuchta | .................... | 395/112 |
| 5,822,507 A | * | 10/1998 | Uda et al. | .................... | 358/1.15 |
| 5,859,710 A | * | 1/1999 | Hannah | .................... | 358/1.15 |
| 6,026,258 A | * | 2/2000 | Fresk et al. | .................... | 358/296 |
| 6,057,940 A | * | 5/2000 | Kawamoto | .................... | 358/404 |
| 6,359,642 B1 | * | 3/2002 | Smith et al. | .................... | 347/247 |

* cited by examiner

Primary Examiner—Stephen R. Funk
Assistant Examiner—Minh Chau
(74) Attorney, Agent, or Firm—Rossi & Associates

(57) ABSTRACT

To reduce the period of time required after a remote printer is instructed to start a print job and before it starts printing and hence reduce the period of time for which the remote printer is occupied, thereby enhancing working efficiency, it is determined whether originals are located on an original table or on a sheet feeder, and if the originals are located on the original table, it is determined whether the job is in an original table accumulation mode in which a local apparatus completes reading images from a plurality of originals before transmitting the images. If the job is not in the original table accumulation mode, the remote apparatus is instructed to start the job before images are read from the originals. On the other hand, if the job is in the original table accumulation mode, the remote apparatus is instructed to start the job after the images have been read from all the originals.

70 Claims, 3 Drawing Sheets

PRINTING SYSTEM AND METHOD, STORAGE MEDIUM, AND IMAGE PROCESSING APPARATUS AND CONTROL METHOD THEREFOR

BACKGROUND OF THE INVENTION

1. Field of the Invention

The present invention relates to a printing system and method based on a remote copy job method, a storage medium storing a program for executing the method, and an image processing apparatus and a control method therefor.

2. Description of the Related Art

As a system comprised of a plurality of copying apparatuses, printing apparatuses, and the like connected together via a network and having an image reading function, a printing function, and other functions, for example, a printing system based on the remote copying job method has been proposed, which transmits image data read from originals by one of the copying apparatuses to another as a remote printer, together with a print job set by a user (operator) and which prints (copies) the image data based on the print job. Further, the copying apparatuses of this system can each read original images from originals placed on a platen (original table) provided in the apparatus or on a sheet feeder such as an ADF, and then transmit the read image data to another copying apparatus as the remote printer.

In this remote copy job method-based system, however, if, for example, the remote printer is instructed to start the print job after images to be formed on recording sheets haven been read from all the originals, then the remote computer starts warming up and a large period of time may thus be required after the images have been read from the originals and before printing of the first sheet is started.

On the other hand, if the remote printer is instructed to start the print job before the copying apparatus starts reading the originals on the original table thereof, a large period of time is required after the remote printer has been instructed to start the print job and before image data are transmitted. Consequently, the period of time for which the remote printer is occupied increases, leading to degraded working efficiency.

Thus, in the case where a plurality of methods are used to read the images from the originals, if an instruction for starting the print job is transmitted to an external apparatus such as the remote printer in a monotonous manner as described above, then inconveniences such as ones described above may result.

SUMMARY OF THE INVENTION

It is an object of the present invention to provide a printing system and method, a storage medium storing a program for executing the method, and an image processing apparatus and a control method therefor, which are free of the above described problems.

It is another object of the present invention to provide a printing system and method, a storage medium storing a program for executing the method, and an image processing apparatus and a control method therefor, which are capable of reducing the period of time required after a remote printer has been instructed to start a print job and before it starts printing and thus the period of time for which the remote printer is occupied, thereby enhancing working efficiency.

To attain the above objects, in a first aspect of the present invention, there is provided a printing system based on a remote copy job method comprising a local apparatus including an original table, a sheet feeder, reading means for reading images from originals on the original table or the sheet feeder, and input means for inputting a job set by an operator, and a remote apparatus connected to the local apparatus and including printing means for printing the images based on the job, wherein the local apparatus comprises instructing means for instructing the remote apparatus to start the job, first determining means for determining whether the originals are located on the original table or on the sheet feeder, and second determining means for determining whether or not the job is in an original table accumulation mode in which images are read from a plurality of originals before being transmitted to the remote apparatus; and wherein when the job is not in the original table accumulation mode, the local apparatus instructs the remote apparatus to start the job before reading the images from the originals, and when the job is in the original table accumulation mode, the local apparatus instructs the remote apparatus to start the job after reading the images from the originals.

Further, if the originals are located on the sheet feeder, the local apparatus instructs the remote apparatus to start the job before reading the images from the originals.

To attain the above objects, in a second aspect of the present invention, there is provided a printing method based on a remote copy job method and used for a printing system comprising a local apparatus for executing a reading step of reading images from originals on an original table or a sheet feeder, and an input step of inputting a job set by an operator, and a remote apparatus connected to the local apparatus, for executing a printing step of printing the images based on the job, the printing method comprising an instructing step of instructing the remote apparatus to start the job, a first determining step of determining whether the originals are located on the original table or on the sheet feeder, and a second determining step of determining whether or not the job is in an original table accumulation mode in which images are read from a plurality of originals before being transmitted to the remote apparatus, and wherein, in the instructing step, when the job is not in the original table accumulation mode, the remote apparatus is instructed to start the job before reading the images from the originals, and when the job is in the original table accumulation mode, the remote apparatus is instructed to start the job after reading the images from the originals.

Also in the second aspect, if the originals are located on the sheet feeder, the remote apparatus is instructed to start the job before reading the images from the originals.

To attain the above objects, in a third aspect of the present invention, there is provided a computer-readable storage medium storing a program for executing a printing method based on a remote copy job method and used for a printing system comprising a local apparatus for executing a reading step of reading images from originals on an original table or a sheet feeder, and an input step of inputting a job set by an operator, and a remote apparatus connected to the local apparatus, for executing a printing step of printing the images based on the job, wherein the printing method comprises an instructing step of instructing the remote apparatus to start the job, a first determining step of determining whether the originals are located on the original table or on the sheet feeder, and a second determining step of determining whether or not the job is in an original table accumulation mode in which images are read from a plurality of originals before being transmitted to the remote apparatus, and wherein, in the instructing step, when the job is not in the original table accumulation mode, the remote apparatus is instructed to start the job before reading the images from the originals, and when the job is in the original table accumulation mode, the remote apparatus is instructed to start the job after reading the images from the originals.

In a typical embodiment of the present invention, the local apparatus and the remote apparatus are each at least one selected from the group consisting of a scanner, a printer, and a copying machine.

To attain the above objects, in a fourth aspect of the present invention, there is provided an image processing apparatus which can transmit data including image data, via a communication path, to an external apparatus which can form images, the image processing apparatus comprising selecting means for selectively executing a first mode in which images can be read from a plurality of originals by means of an intervening operation by an operator and a second mode in which the images can be read from the plurality of originals without any intervening operation by the operator, and control means for providing such control that if the selected mode is the first mode, an instruction for starting an image forming process is transmitted to the external apparatus via the communication path after a plurality of images to be formed on one recording sheet have all been read, and if the selected mode is the second mode, the instruction for starting the image forming process is transmitted to the external apparatus via the communication path before an original reading process is started.

To attain the above objects, in a fifth aspect of the present invention, there is provided a method of controlling an image processing apparatus which can transmit data including image data, via a communication path to an external apparatus which can form images, the control method comprising a selecting step of selectively executing a first mode in which images can be read from a plurality of originals by means of an intervening operation by an operator and a second mode in which the images can be read from the plurality of originals without any intervening operation by the operator, and a control step of providing such control that if the selected mode is the first mode, an instruction for starting an image forming process is transmitted to the external apparatus via the communication path after a plurality of images to be formed on one recording sheet have all been read, and if the selected mode is the second mode, the instruction for starting the image forming process is transmitted to the external apparatus via the communication path before an original reading process is started.

To attain the above objects, in a sixth aspect of the present invention, there is provided an image processing apparatus which can execute a reading process on originals and transmit data including image data read from the originals, to an external apparatus, the image processing apparatus comprising a document feeder, means for selectively executing a first reading mode in which images are read from the originals via the document feeder for feeding the originals and a second reading mode in which the images are read from the originals without using the document feeder, wherein the external apparatus processes image data from the image processing apparatus upon receiving a job start instruction from the image processing apparatus, and control means for providing such control that when the first reading mode is executed, the job start instruction is transmitted to the external apparatus before an original reading process is executed, whereas, when the second reading mode is executed, the job start instruction is transmitted to the external apparatus after the original reading process has been executed.

Preferably, in the sixth aspect, the external apparatus operates so as not accept any other job after receiving the job start instruction from the image processing apparatus and before completing processing the image data from the image processing apparatus.

In a preferred embodiment of the sixth aspect, the external apparatus comprises image forming means for forming images on sheets based on image data, and has a plurality of image forming modes including a first image forming mode in which images for a plurality of pages are formed on one sheet, and wherein the image processing apparatus comprises setting means for setting one of the plurality of image forming modes to be executed by the external apparatus.

More preferably, when the second reading mode is executed, the control means also causes the job start instruction to be transmitted to the external apparatus before executing the reading process on the originals, based on the image forming mode set by the setting means.

Further preferably, the control means causes the job start instruction to be transmitted after executing the reading process on the originals, when the second reading mode is executed and at the same time the first image forming mode is set by the setting means, and causes the job start instruction to be transmitted to the external apparatus before executing the reading process on the originals, when the second reading mode is executed and at the same time an image forming mode other than the first image forming mode is set by the setting means.

The first image forming mode includes an image forming mode for forming images on both sides of a sheet.

The first image forming mode includes an image forming mode for forming a plurality of images on the same side of a sheet.

The image forming mode other than the first image forming mode includes an image forming mode for forming images on one side of a sheet.

Preferably, the control means provides such control that the image data read from the originals are transmitted to the external apparatus after the job start instruction is transmitted to the external apparatus irrespective of whether the first reading mode or the second reading mode is executed.

More preferably, image processing apparatus according to the sixth aspect comprises storage means storing read images, and when the second reading mode is executed, all images to be read from originals are stored in the storage means before image data from the originals are transmitted to the external apparatus.

Preferably, when the first reading mode is executed, the control means provides such control that the image data from the originals are transmitted to the external apparatus without using the storage means.

The image processing apparatus according to the sixth aspect comprises image forming means for forming images on sheets based on the image data.

To attain the above objects, in a seventh aspect of the present invention, there is provided a method of controlling an image processing apparatus which can execute a reading process on originals and transmit data including image data read from the originals, to an external apparatus, the method comprising a step of causing the image processing apparatus to selectively execute a first reading mode in which images are read from the originals via a document feeder for feeding the originals and a second mode in which the images are read from the originals without using the document feeder, a step of causing the external apparatus to process image data from the image processing apparatus upon receiving a job start instruction from the image processing apparatus, and a control step of providing such control that when the first reading mode is executed, the job start instruction is transmitted to the external apparatus before an original reading process is executed, whereas, when the second reading mode is executed, the job start instruction is transmitted to the external apparatus after the original reading process has been executed.

To attain the above objects, in an eighth aspect of the present invention, there is provided a computer-readable storage medium storing a program for causing an image processing apparatus which can execute a reading process on originals and transmit data including image data read from the originals, to execute a step of causing the image processing apparatus to selectively execute a first reading mode in which images are read from the originals via a document feeder for feeding the originals and a second mode in which the images are read from the originals without using the document feeder, a step of causing the external apparatus to process image data from the image processing apparatus upon receiving a job start instruction from the image processing apparatus, and a control step of providing such control that when the first reading mode is executed, the job start instruction is transmitted to the external apparatus before an original reading process is executed, whereas, when the second reading mode is executed, the job start instruction is transmitted to the external apparatus after the original reading process has been executed.

The above and other objects, features, and advantages of the present invention will be apparent from the following specification and drawings.

DETAILED DESCRIPTION OF THE PREFERRED EMBODIMENT

The present invention will now be described with reference to the drawings showing a preferred embodiment thereof.

Figure 1:
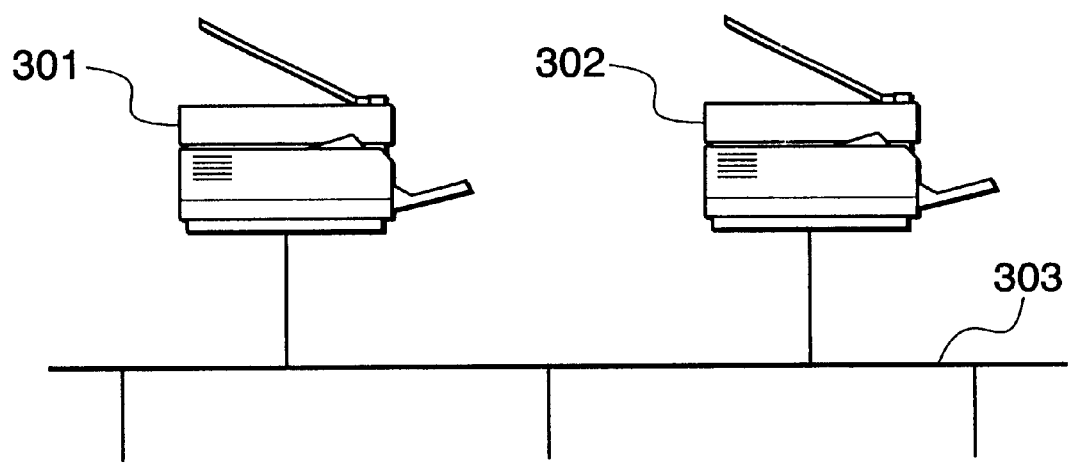
FIG. 1 is a schematic view showing the entire construction of a printing system based on the remote copy job method according to an embodiment of the present invention.

FIG. 1 is a schematic view showing the entire configuration of a printing system based on the remote copy job method according to an embodiment of the present invention.

In FIG. 1, copying apparatuses 301 and 302 are each comprised of an image reading device for reading images from originals, a printing device for printing the images, and the like, and are connected together via a network 303 (communication path) so as to transmit and receive data such as control data and image data via this network. In the present embodiment, the copying apparatus 301 is used as a local apparatus, while the copying apparatus 302 is used as a remote apparatus (remote printer). In addition to the copying apparatuses 301 and 302, a plurality of other copying apparatuses, computer terminals, servers, and others (not shown) may be present on the network 303.

Figure 2:
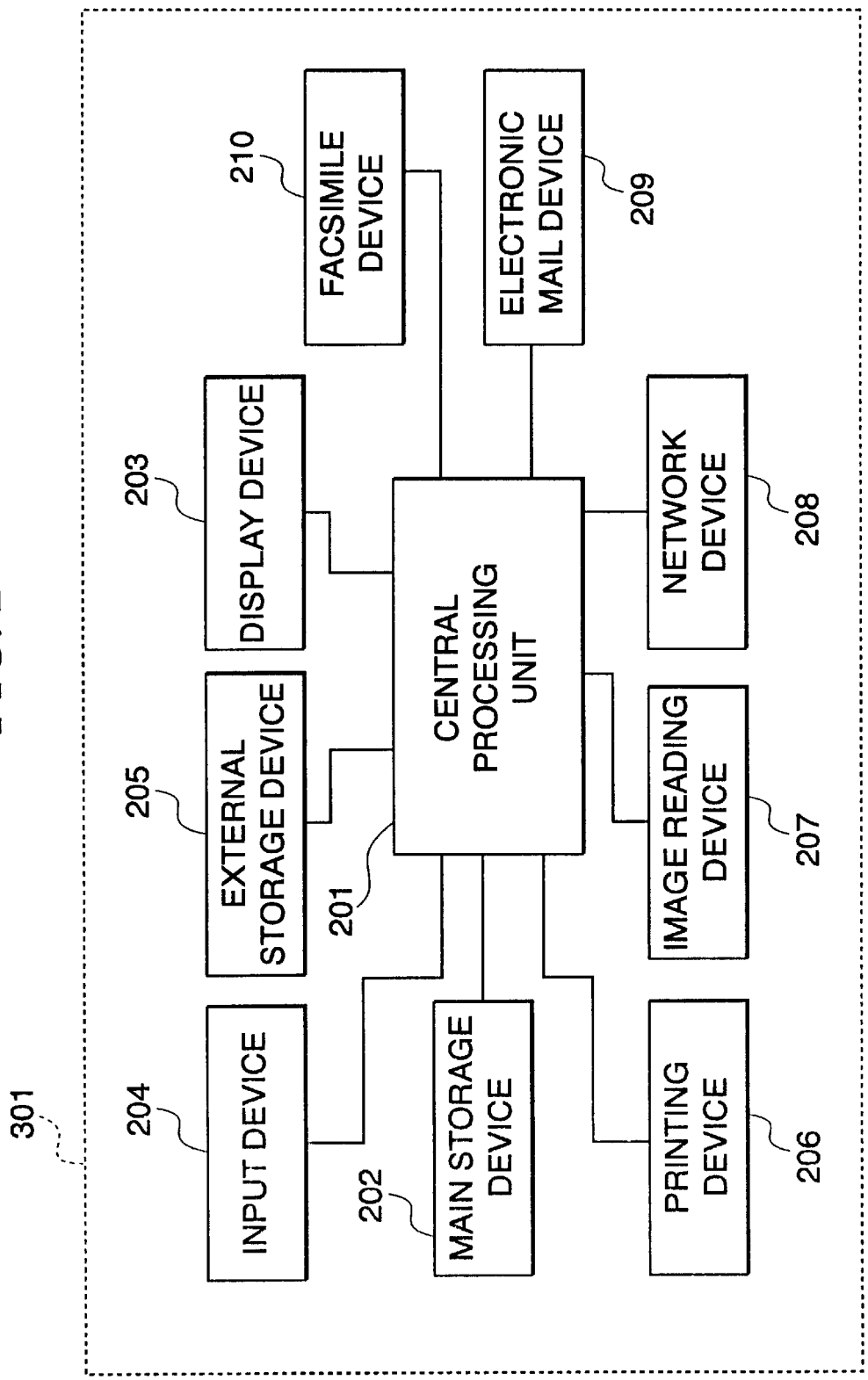
FIG. 2 is a block diagram showing the internal configuration of a copying apparatus 301 appearing in FIG. 1.

FIG. 2 is a block diagram showing the internal configuration of the copying apparatus 301 in FIG. 1. The copying apparatus 302 has a construction similar to that of the copying apparatus 301, and the copying apparatus 301 alone will thus be described.

In FIG. 2, the copying apparatus 301 is comprised of a central processing unit 201, a main storage device 202, a display device 203, an input device 204, an external storage device 205, a printing device 206, an image reading device 207, a network device 208, an electronic mail device 209, a facsimile device 210, and others.

Connected to the central processing unit 201 are connected a ROM, not shown, that stores program codes for executing various processes including one shown in a flow chart in FIG. 3, described below, the main storage device 202 composed of various memories such as an image memory which can store a plurality of pages of image data from image sources including the image reading device 207 and image forming apparatuses including the copying apparatus 302, the display device 203, the input device 204, the external storage device 205, the printing device 206, the image reading device 207, the network device 208, the electronic mail device 209, and the facsimile device 210. The central processing unit 201 controls all these devices and executes arithmetic processes such as arithmetic operations and logical operations. The main storage device 202 stores information required by the central processing unit 201 to execute various arithmetic operations and information processing and the stored information can be taken out by the central processing unit 201 as required. The display device 203 is comprised of a CRT type, or a liquid crystal type, a touch panel type monitor, and displays results of processing of images such as graphics or characters.

The input device 204 is comprised of a keyboard, a mouse, a card reader, a touch panel, and others to input various data to the central processing unit 201. A user (operator) can input, via the input device 204, required print jobs and various operation modes including: a normal copy mode; a double-side copy mode; various image forming modes including reduced layout modes such as a 4in1 mode in which images from four pages are arranged and formed on the same surface of a sheet and a 2in1 mode in which images from two pages are arranged and formed on the same surface of a sheet, and enlarged layout modes such as a 1toN mode in which an image on one original sheet is divided into a plurality of areas so that the images obtained by the division are formed on different recording sheets; and postprocess modes such as a sort mode and a staple mode. The external storage device 205 is comprised of a magnetic storage device, a photo-magnetic storage device, or the like to store various information. The printing device 206 prints images such as graphics or characters. The image reading device 207 is comprised of a platen (original table) on which originals such as sheets are placed to allow images to be read therefrom, and a sheet feeder such as an ADF or RDF which automatically and sequentially feeds a bundle of sheets set in a loading section to an original reading location for a reading process. The image reading device 207 reads images from the originals and converts them into electronic information (image data). Further, the image reading device 207 is provided with a sheet presence detecting sensor, not shown, for detecting whether the originals are located on the original table or on the sheet feeder.

The network device 208 is an interface connecting the present apparatus to the network 303. The electronic mail device 209 transmits and receives mails to and from external apparatuses via the network 303. The facsimile device 208 transmits and receives facsimiles to and from external apparatuses. The copying apparatus 301 may be a facsimile machine or a composite machine, which is provided with a scanner and an image reading device, and the copying apparatus 302 may be a printer, a facsimile machine, or a composite machine.

In the present embodiment, the copying apparatus 301 as a local apparatus is constructed not only to cause the local printing device 206 to print read original images but also to transmit the original images read by the copying apparatus 301 to the copying apparatus 302 connected thereto via the network 303, together with a print job set by the operator. The copying apparatus as a remote apparatus (remote printer) is constructed to print the received images based on the print job (it is also possible to cause the copying apparatus 302 to read and transmit image data to the copying apparatus 301 and then cause the copying apparatus 301 to print the image data from the copying apparatus 302 based on an operation mode set by the copying apparatus 302). Further, in reading images from a plurality of originals on the platen (original table) of the image reading device 207, the copying apparatus 301 can set as a print job a platen (original table) accumulation mode in which a plurality of read original images are temporally accumulated in the main storage device 202, followed by transmitting of the accumulated image data to the copying apparatus 302.

Further, original images read by the copying apparatus 301 can be distributed to the local printing device 206 and the remote copying device 302 for printing. Moreover, if apparatuses other than the copying apparatus 301 are connected to the network 303 and the copying apparatus 301 can thus transmit data to such a plurality of apparatuses, then an operating section of the copying apparatus 301 can be used to designate one or more destinations to which read original images can be transmitted.

Figure 3:
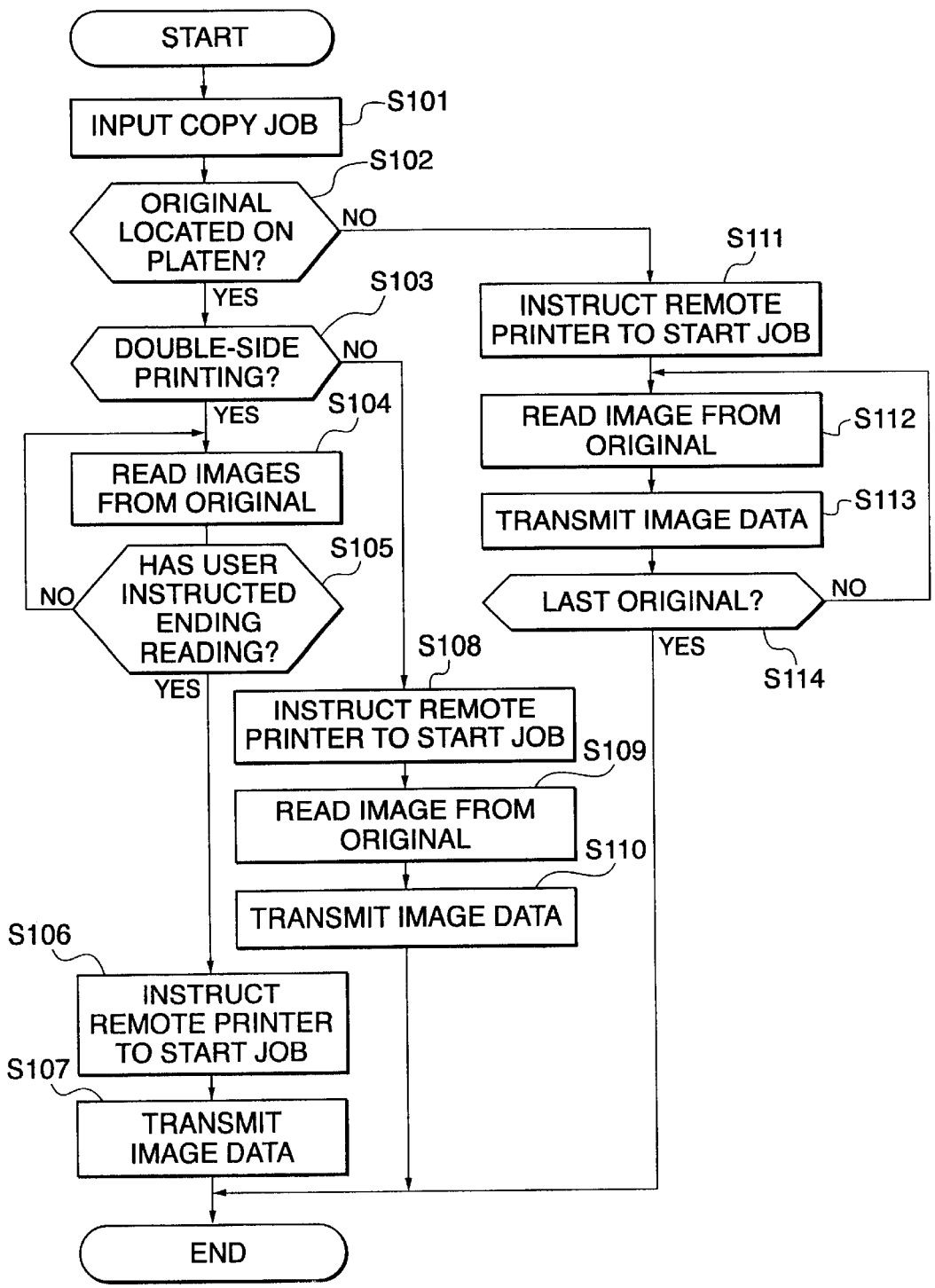
FIG. 3 is a flow chart of a control process executed by the copying apparatus 301 appearing in FIG. 1.

FIG. 3 is a flow chart showing a control process executed by the copying apparatus 301 in FIG. 1. This process is executed when the remote copy mode is selected by the input device 204 of the copying apparatus 301 based on settings by the operator.

In the present process, the copying apparatus 301 is used as an apparatus for reading images from originals, and the copying apparatus 302 is used as a remote printer for printing the original images. Further, if the operator places originals on the original table of the image reading device 207 and instructs (sets) both sides of the originals to be printed, via the input device 204, then the copying apparatus 301 enters the platen (original table) accumulation mode in which image data read from the front side of the original and image data read from the back side thereof are simultaneously transmitted to the copying apparatus 302.

First, the operator inputs (issues an instruction for) a required copy job (job) from the input device 204 of the copying apparatus 301, to instruct the copying apparatus 302 as the remote computer to start the copy job (input the copy job) (step S101). Then, the copying apparatus 301 determines whether an original to be read is located on the original table of the image reading device 207 or on the sheet feeder such as an ADF, based on a result of detection by the sheet presence detecting sensor, not shown, or mode setting information from the operating section (input device 204) (step S102). If the copying apparatus 301 determines that the original is located on the original table (the copying apparatus 301 determines that the job is in the platen accumulation mode (first mode)) (the result of the determination at the step S102 is affirmative), then it determines whether or not the job input at the step S101 is the double-side printing, based on the mode setting information from the input device 204 or the like (step S103). As a result, if the job input at the step S101 is the double-side printing (the result of the determination at the step S103 is affirmative), images are read from the original on the original table of the image reading device 207 to generate image data, which are then stored in the main storage device 202 (step S104).

Then, the display device 203 is caused to display a popup screen including a reread button and a read end button, to prompt the operator to input, via this screen, an instruction for reading images from the next original or an instruction for ending the reading of images from the originals (step S105). As a result, if the operator depresses the reread button to instruct reading images from the next original (the result of the determination at the step S105 is negative), the process returns to the step S104 to read images from the next original newly set on the original table of the image reading device 207 by the operator, thereby generating image data (step S104). In this connection, only the read end button may be displayed without displaying the reread button, and the process of reading originals on the platen (original table) may be repeated until the operator depresses the read end button so that a plurality of original images are sequentially accumulated in the main storage device 202.

On the other hand, if the operator depresses the read end button to input the instruction for ending the reading of original images (the result of the determination at the step S105 is affirmative), then the copying apparatus 302 as the remote printer is instructed via the network 303 to start the job (step S106). Then, the original image data accumulated in the main storage device 202 are transmitted to the copying apparatus via the network 303 (step S107), thereby completing this process. The copying apparatus 302 as the remote printer executes the double-side printing on the received image data based on the instruction for starting the job.

Upon receipt of the instruction for starting the job from the copying apparatus 301 via the network 303, the copying apparatus 302 as the remote printer warms up a printer section and its related sections so as to make them ready to form images (this warming-up is executed if the copying apparatus 302 has no print job, for example. If any print job is present, the coping apparatus has already been warmed up).

Further, with respect to the order in which the copying apparatus 302 forms images, if the copying apparatus 302 has no print job when receiving the instruction for starting a job from the copying apparatus 301, then it executes job scheduling so as to use image data sent from the copying apparatus 301 via the network 303, as the first job for image formation. That is, before the print job from the copying apparatus 301 is completed, the copying apparatus 302 does not accept any other print job (does not form any image for the other print job) and is thus occupied by the copying apparatus 301. On the other hand, if the copying apparatus 302 already has any print job when receiving the instruction for starting a job from the copying apparatus, it executes job scheduling such that it waits for the already present print job to be completed before it executes the print job from the copying apparatus 301.

On the other hand, if the copying apparatus 301 determines that the job input at the step S101 is not the double-side printing (the result of the determination at the step S103 is negative), it instructs, via the network 303, the copying apparatus 302 as the remote printer to start the job (step S108), and reads an image from the original on the original table of the image reading device 207 to generate image data (step S109). If the job is not the double-side printing, it is unnecessary to simultaneously transmit image data from both sides of the original, that is, a plurality of image data. Accordingly, at a step S110, the image data generated from the original are transmitted to the copying apparatus 302 as the remote printer without prompting the operator to input the instruction for ending the reading, thereby completing this process.

In the present embodiment, at the step S103, the copying apparatus 301 determines whether or not the print job is the double-side printing mode job, but as another embodiment, whether the print job is in the reduced layout mode such as the 2in1 or 4in1 mode or not may be determined. More specifically, if the print job is one of such a mode as the reduced layout mode in which a plurality of images are formed on one recording sheet, control is provided at the steps S104, S105, etc. such that the process of reading images from the originals on the platen (the operation of setting originals on the original table by the operator and then reading images from these originals) is repeatedly executed so that the resulting image data are continuously accumulated in the main storage device 202 until the plurality of original images to be formed on one sheet are all loaded in the main storage device 202. Then, when the instruction for ending the reading is input by the operator, job start instruction data are transmitted to the remote printer (copying machine 302) via the network 303 in order to cause the remote printer (copying apparatus 302) to perform the warm-up operation for making the remote printer ready to immediately start an image forming process upon receiving the image data as a result of the instruction. The remote printer performs the warm-up operation in response to the receipt of the job start instruction data, to enter a standby state in which it can print images immediately upon receiving the image data. The plurality of image data (to be formed on one sheet) accumulated in the main storage device 202 are transmitted together to the remote printer via the network 303 (batch transmission of the plurality of images).

If, at the step S102, the copying apparatus 301 determines that an original to be read is located on the sheet feeder of the image reading device 207 (the copying apparatus 301 determines that the job is in a non-plate-accumulation mode (second mode)) (the result of the determination at the step S102 is negative), then the copying apparatus 301 instructs, via the network 303, the copying apparatus 302 as the remote printer to start the job (step S111).

When the copying apparatus 302 has received a job start instruction from the copying apparatus 301, if the copying machine 302 already has a print job now being executed or a print job waiting for printing to be started, then it executes job scheduling so as to first execute the print job now being executed or the print job waiting for printing to be copied before executing the print job to be transmitted from the copying apparatus 301 in response to the job starting instruction. On the other hand, when the copying apparatus 302 receives the job start instruction from the copying apparatus 301, if the copying machine 302 then has no print job and is on standby, it performs the warm-up operation and executes job scheduling so as to first execute the print job to be transmitted from the copying apparatus 301 in response to the job start instruction. Here, it is assumed that the copying apparatus 302 has received the job start instruction while having no print job.

After execution of the above step S111, the copying apparatus 301 as a local apparatus draws in the first original from the sheet feeder of the reading device 207 (step S112), reads an image from this original to generate image data (step S112), and transmits the original image data to the copying apparatus 302 as the remote printer via the network 303 (step S113). The copying apparatus 301 then determines whether or not the read original is the last one (step S114). If it determines that the read original is not the last one (step S114), the process returns to the step S112, where the copying apparatus 301 again draws in the second original from the sheet feeder of the image reading device 207 and reads an image from this original to generate image data (step S112). On the other hand, if the copying apparatus determines that the read original is the last one, the present process is terminated. At the step S103, instead of the determination as to whether or not the copy job input at the step S101 is the double-side printing, it may be determined whether or not the copy job is printing of images from a plurality of originals.

According to the present embodiment, in the system in which the copying apparatuses 301 and 302 which can selectively execute the platen (original table) accumulation mode (an original reading mode in which originals (or a plurality of originals placed on the original table in juxtaposition by the operator) are read sheet by sheet using the platen and the non-platen accumulation mode (an ADF reading mode in which a plurality of originals can be automatically and continuously read in order of page using a sheet feeder such as an ADF and without the use of the platen or the like) are connected together via the network 303, when the copying apparatus 301 determines that an original is located on the original table (the result of the determination at the step S102 is affirmative) and that a job input to the copying apparatus 302 as the remote printer is not in the platen (original table) accumulation mode (the result of the determination at the step S103 is negative), it instructs the copying apparatus 302 to start the job before reading images from the originals (step S108). As a result, the remote printer can be warmed up during the reading of the originals, thus reducing the period of time required before the copying apparatus 302 starts printing the first original. On the other hand, when the copying apparatus 301 determines that the input job is in the platen (original table) accumulation mode (the result of the determination at the step S103 is affirmative), it instructs the copying apparatus 302 to start the job after reading images from all the originals (steps S104 and S105). This reduces the period of time required after the copying apparatus 302 has been instructed to start the job and before it starts printing and thus reduces the period of time for which the remote printer (the copying apparatus 302) is occupied by the local printer (the copying apparatus 301), thus enhancing the working efficiency.

That is, in such a mode as the double-side printing mode or the Nin1 mode in which a plurality of images are formed on one sheet, if the job is in such a mode as the platen (original plate) accumulation mode (first mode) in which the original reading process is executed without using an automatic document feeding (ADF) unit or the like, the step of setting each of a plurality of originals on the original table by the operator has to be intervened before images are read from the all of originals, so that a large period of timer is required after reading of the first original is started and until images on the plurality of original s to be formed on one recording sheet are read. Taking this into consideration, according to the present embodiment, control is provided such that the images on the plurality of originals to be formed on one sheet are all accumulated in the memory, and then the job start instruction is transmitted to the remote printer immediately before the accumulated data are transmitted thereto.

On the other hand, in the non-platen accumulation mode (second mode), the step of setting originals on the original table by the operator is not intervened, and a bundle of a plurality of originals are continuously read at a time by the sheet feeder, thereby reducing the period of time required after the start of reading the bundle of originals and before the completion of the same. Thus, according to the present embodiment, control is provided such that the job start instruction is transmitted to the remote printer the process of reading images from the originals is started.

As described above, according to the present embodiment, if a plurality of read modes are employed, the inconveniences such as an unwanted increase in the period of time for which the remote printer is occupied or an increase in the period of time required before the copying apparatus starts printing the first page can be prevented, whichever read mode is selected.

A program for realizing the processes (functions) of the above described embodiment is stored in the ROM, not shown, in the main storage device 202 of the copying apparatus 301 in the form of a program code, which is read out by the central processing unit 201 of the copying apparatus 301 to execute the functions.

It is to be understood that the present invention may also be realized by supplying the copying apparatus 301 or a system including the same with a storage medium which stores the program code of software that realizes the functions of the above described embodiment, and causing a computer (CPU, MPU, or the like) of the apparatus or system to read out and execute the program code stored in the storage medium. In this case, the program code itself read out from the storage medium realizes the above described functions of the present invention, so that the storage medium storing the program code also constitutes the present invention. The storage medium for supplying the program code may be selected, for example, from a floppy disk, hard disk, optical disk, magneto-optical disk, CD-ROM, CD-R, magnetic tape, non-volatile memory card, and ROM.

It is also to be understood that the functions of the above described embodiment can be realized not only by executing a program code read out by a computer, but also by causing an operating system (OS) that operates on the computer to perform a part or the whole of the actual operations according to instructions of the program code.

Furthermore, the program code read out from the storage medium may be written into a memory provided in an expanded board inserted in the computer, or an expanded unit connected to the computer, and a CPU or the like provided in the expanded board or expanded unit may then perform a part or all of the actual operations according to the instructions of the program code, so as to accomplish the functions of the above described embodiment.

As described above in detail, according to the present embodiment, the local apparatus determines whether an original is located on the platen (original table) or on the sheet feeder, and instructs the remote apparatus to start a job before reading an image from the original if the original is located on the original table and at the same time the job is not in the platen (original table) accumulation mode in which the local apparatus transmits images from a plurality of originals before completing reading the images. On the other hand, if the job is in the platen (original table) accumulation mode, the local apparatus instructs the remote apparatus to start the job after completing reading the images from the originals. This reduces the period of time required after the remote apparatus has been instructed to start the job and before it starts printing and hence reduces the period of time for which the remote printer is occupied, thus enhancing the working efficiency.

What is claimed is:

1. A printing system based on a remote copy job method comprising a local apparatus including an original table, a sheet feeder, reading means for reading images from originals on the original table or said sheet feeder, and input means for inputting a job set by an operator, and a remote apparatus connected to said local apparatus and including printing means for printing the images based on the job, wherein said local apparatus comprises:
instructing means for instructing said remote apparatus to start the job;
first determining means for determining whether the originals are located on the original table or on said sheet feeder; and
second determining means for determining whether or not the job is in an original table accumulation mode in which images are read from a plurality of originals before being transmitted to said remote apparatus, and
wherein when the job is not in the original table accumulation mode, said local apparatus instructs said remote apparatus to start the job before reading the images from the originals, and when the job is in the original table accumulation mode, said local apparatus instructs said remote apparatus to start the job after reading the images from the originals.

2. A printing system based on a remote copy job method according to claim 1, wherein if the originals are located on said sheet feeder, said local apparatus instructs said remote apparatus to start the job before reading the images from the originals.

3. A printing system based on a remote copy job method according to claim 1, wherein said local apparatus is at least one selected from the group consisting of a scanner, a printer, and a copying machine.

4. A printing system based on a remote copy job method according to claim 1, wherein said remote apparatus is at least one selected from the group consisting of a scanner, a printer, and a copying machine.

5. A printing method based on a remote copy job method and used for a printing system comprising a local apparatus for executing a reading step of reading images from originals on an original table or a sheet feeder, and an input step of inputting a job set by an operator, and a remote apparatus connected to the local apparatus, for executing a printing step of printing the images based on the job, the printing method comprising:

an instructing step of instructing said remote apparatus to start the job;
a first determining step of determining whether the originals are located on the original table or on said sheet feeder; and
a second determining step of determining whether or not the job is in an original table accumulation mode in which images are read from a plurality of originals before being transmitted to said remote apparatus, and
wherein, in said instructing step, when the job is not in the original table accumulation mode, said remote apparatus is instructed to start the job before reading the images from the originals, and when the job is in the original table accumulation mode, said remote apparatus is instructed to start the job after reading the images from the originals.

6. A printing method based on a remote copy job method according to claim 5, wherein if the originals are located on said sheet feeder, said remote apparatus is instructed to start the job before reading the images from the originals.

7. A printing method based on a remote copy job method according to claim 5, wherein said local apparatus is at least one selected from the group consisting of a scanner, a printer, and a copying machine.

8. A printing method based on a remote copy job method according to claim 5, wherein remote local apparatus is at least one selected from the group consisting of a scanner, a printer, and a copying machine.

9. A computer-readable storage medium storing a program for executing a printing method based on a remote copy job method and used for a printing system comprising a local apparatus for executing a reading step of reading images from originals on an original table or a sheet feeder, and an input step of inputting a job set by an operator, and a remote apparatus connected to the local apparatus, for executing a printing step of printing the images based on the job, wherein the printing method comprises:
    an instructing step of instructing said remote apparatus to start the job;
    a first determining step of determining whether the originals are located on the original table or on said sheet feeder; and
    a second determining step of determining whether or not the job is in an original table accumulation mode in which images are read from a plurality of originals before being transmitted to said remote apparatus, and
    wherein, in said instructing step, when the job is not in the original table accumulation mode, said remote apparatus is instructed to start the job before reading the images from the originals, and when the job is in the original table accumulation mode, said remote apparatus is instructed to start the job after reading the images from the originals.

10. A storage medium according to claim 9, wherein said instructing step comprises instructing said remote apparatus to start the job before reading the images from the originals, if the originals are not located on said original table.

11. A storage medium according to claim 9, wherein said local apparatus is at least one selected from the group consisting of a scanner, a printer, and a copying machine.

12. A storage medium according to claim 9, wherein remote local apparatus is at least one selected from the group consisting of a scanner, a printer, and a copying machine.

13. An image processing apparatus for transmitting data including image data to an external apparatus which forms images, the image processing apparatus comprising:
    selecting means for selectively executing a first mode in which images are read from a plurality of originals via an intervening operation by and operator and a second mode in which the images are read from the plurality of originals without the intervening operation by the operator; and
    control means for, if the selected mode is the first mode, transmitting an instruction for starting an image forming process to the external apparatus after a plurality of images to be formed on a recording sheet have all been read, and if the selected mode is the second mode, transmitting the instruction for stating the image forming process to the external apparatus before the plurality of images to be formed on the recording sheet have all been read.

14. A method of controlling an image processing apparatus for transmitting data including image data to an external apparatus which forms images, the method comprising the steps of:
    selectively executing a first mode in which images are read from a plurality of originals via an intervening operation by an operator or a second mode in which the images are read from the plurality of originals without the intervening operation by the operator; and
    if the selected mode is the first mode, transmitting an instruction for starting an image forming process to the external apparatus after a plurality of images to be formed on a recording sheet have all been read, and if the selected mode is the second mode, transmitting the instruction for starting the image forming process to the external apparatus before the plurality of images to be formed on the recording sheet have all been read.

15. An image processing apparatus for executing a reading process on originals and for transmitting data including image data read from the originals, to an external apparatus, the image processing apparatus comprising:
    a document feeder;
    means for selectively executing a first reading mode in which images are read from the originals via said document feeder for feeding the originals and a second reading mode in which the images are read from the originals without using said document feeder;
    wherein the external apparatus processes image data from said image processing apparatus upon receiving a job start instruction from said image processing apparatus; and
    control means fort when the first reading mode is executed, transmitting the job start instruction to the external apparatus before an original reading process is executed, and, when the second reading mode is executed, transmitting the job start instruction to the external apparatus after the original reading process has been executed.

16. An image processing apparatus according to claim 15, wherein the external apparatus operates so as not accept any other job after receiving the job start instruction from said image processing apparatus and before completing processing the image data from said image processing apparatus.

17. An image processing apparatus according to claim 15, wherein the external apparatus comprises image forming means for forming images on sheets based on image data, and has a plurality of image forming modes including a first image forming mode in which images for a plurality of pages are formed on one sheet, and
    wherein said image processing apparatus comprises setting means for setting one of the plurality of image forming modes to be executed by the external apparatus.

18. An image processing apparatus according to claim 17, wherein when the second reading mode is executed, said control means also causes the job start instruction to be transmitted to the external apparatus before executing the reading process on the originals, based on the image forming mode set by said setting means.

19. An image processing apparatus according to claim 18, wherein said control means causes the job start instruction to be transmitted after executing the reading process on the originals, when the second reading mode is executed and at the same time the first image forming mode is set by said setting means, and causes the job start instruction to be transmitted to the external apparatus before executing the reading process on the originals, when the second reading mode is executed and at the same time an image forming mode other than the first image forming mode is set by said setting means.

20. An image processing apparatus according to claim 19, wherein the first image forming mode includes an image forming mode for forming images on both sides of a sheet.

21. An image processing apparatus according to claim 19, wherein the first image forming mode includes an image forming mode for forming a plurality of images on the same side of a sheet.

22. An image processing apparatus according to claim 19, wherein the image forming mode other than the first image forming mode includes an image forming mode for forming images on one side of a sheet.

23. An image processing apparatus according to claim 15, wherein said control means provides such control that the image data read from the originals are transmitted to the external apparatus after the job start instruction is transmitted to the external apparatus irrespective of whether the first reading mode or the second reading mode is executed.

24. An image processing apparatus according to claim 23, comprising storage means storing read images, and
wherein when the second reading mode is executed, all images to be read from originals are stored in the storage means before image data from the originals are transmitted to the external apparatus.

25. An image processing apparatus according to claim 24, wherein when the first reading mode is executed, said control means provides such control that the image data from the originals are transmitted to the external apparatus without using said storage means.

26. An image processing apparatus according to claim 15, comprising image forming means for forming images on sheets based on the image data.

27. A method of controlling an image processing apparatus for executing a reading process on originals and for transmitting data including image data read from the originals, to an external apparatus, the method comprising the steps of:
causing said image processing apparatus to selectively execute a first reading mode in which images are read from the originals via a document feeder for feeding the originals and a second reading mode in which the images are read from the originals without using said document feeder;
causing the external apparatus to process image data from said image processing apparatus upon receiving a job start instruction from said image processing apparatus; and
when the first reading mode is executed, transmitting the job start instruction to the external apparatus before an original reading process is executed, and, when the second reading mode is executed, transmitting the job start instruction to the external apparatus after the original reading process has been executed.

28. A computer-readable storage medium storing a program for causing an image processing apparatus for executing a reading process on originals and for transmitting data including image data read from the originals, to an external apparatus, the storage medium containing instructions to:
cause said image processing apparatus to selectively execute a first reading mode in which images are read from the originals via a document feeder for feeding the originals and a second reading mode in which the images are read from the originals without using said document feeder;
cause the external apparatus to process image data from said image processing apparatus upon receiving a job start instruction from said image processing apparatus; and
when the first reading mode is executed, transmit the job start instruction to the external apparatus before an original reading process is executed, and, when the second reading mode is executed, transmit the job start instruction to the external apparatus after the original reading process has been executed.

29. A method of controlling a system including a second apparatus for receiving a series of data input in one of a plurality of data inputting modes, including a first inputting mode and a second inputting mode, to a first apparatus, from the first apparatus, and for performing a predetermined process based on the data forming at least part of the series of data from the first apparatus, the method comprising the steps of:
causing the second apparatus to execute an operation for performing the predetermined process based on the data forming at least part of the series of data from the first apparatus after an inputting process for inputting data required for the predetermined process to be performed in the second apparatus, of the series of data, has been finished in the first apparatus when the first apparatus is the first inputting mode; and
causing the second apparatus to execute the operation for performing the predetermined process based on the data forming at least part of the series of data from the first apparatus before the inputting process for inputting the data required for the predetermined process to be performed in the second apparatus, of the series of data, has been finished in the first apparatus when the first apparatus is the second inputting mode.

30. A method according to claim 29, wherein the first inputting mode includes an inputting mode in which all data of the series of data are input via an intervening operation executed by an operator of the first apparatus, and wherein the second inputting mode includes an inputting mode in which all the data of the series of data are input without the intervening operation being executed by the operator in the first apparatus.

31. A method according to claim 29, wherein the first inputting mode includes an inputting mode in which all data of the series of data are input without using a document feeder for feeding originals of the first apparatus, and wherein the second inputting mode includes an inputting mode in which all the data of the series of data are input using the document feeder of the first apparatus.

32. A method according to claim 29, wherein when the inputting mode in the first apparatus is the second inputting mode, and the second apparatus executes the operation for performing the predetermined process based on the data forming at least part of the series of data from the first apparatus before the inputting process for inputting the data required for the predetermined process to be performed in the second apparatus, of the series of data, has been started in the first apparatus.

33. A method according to claim 29, wherein the predetermined process includes an image forming process for forming an image based on the data forming at least part of the series of data from the first apparatus on a sheet, and wherein when the first apparatus is in the first inputting mode, the second apparatus executes an operation for performing the image forming process based on the data forming at least part of the series of data from the first apparatus after an inputting process for inputting data required for the image forming process to be performed in the second apparatus, of the series of data, has been finished in the first apparatus, and when the first apparatus is in the second inputting mode, the second apparatus executes the operation for performing the image forming process based on the data forming at least part of the series of data from the first apparatus before the inputting process for inputting the data required for the image forming process to be performed in the second apparatus, of the series of data, has been finished in the first apparatus.

34. A method according to claim 29, wherein the second apparatus performs an image forming mode selected by an operator from a plurality of image forming modes, including a predetermined image forming mode in which a plurality of images are formed on a single sheet, and further including the steps of determining whether or not the selected image forming mode is the predetermined image forming mode, and determining whether or not to cause the second apparatus to execute the operation for performing the predetermined process based on the data forming at least part of the series of data from the first apparatus after the inputting process for inputting data required for the predetermined process to be performed in the second apparatus, of the series of data, have been finished in the first apparatus in accordance with a determining result of said image forming mode determining step when the first apparatus is in the first inputting mode, and causing the second apparatus to execute the operation for performing the predetermined process based on the data forming at least part of the series of data from the first apparatus before the inputting process for inputting the data required for the predetermined process to be performed in the second apparatus, of the series of data, has been finished in the first apparatus without the image forming mode determining step being executed when the first apparatus is in the second inputting mode.

35. A method according to claim 29, wherein the second apparatus performs an image forming mode selected by an operator from a plurality of image forming modes, including a predetermined image forming mode in which a plurality of images are formed on a single sheet, and wherein when the first apparatus is in the first inputting mode, the second apparatus executes the operation for performing the predetermined process based an the data forming at least part of the series of data from the first apparatus after an inputting process for inputting data required for the predetermined process to be performed in the second apparatus, of the series of data, has been finished in the first apparatus when the selected image forming mode is the predetermined image forming mode, and the second apparatus executes the operation for performing the predetermined process based on the data forming at least part of the series of data from the first apparatus before the inputting process for inputting the data required for the predetermined process to be performed in the second apparatus, of the series of data, has been finished in the first apparatus when the selected image forming mode is an image forming mode other than the predetermined image forming mode.

36. A method according to claim 35, wherein the predetermined image forming mode includes at least one of an image forming mode in which images are formed on both sides of a sheet, and an image forming mode in which images are on a same side of a sheet, and wherein the image forming mode other than the predetermined image forming mode includes at least an image forming mode in which a single image is formed on one side of a sheet.

37. A method according to claim 29, wherein the first apparatus and the second apparatus are arranged remotely from each other.

38. A method according to claim 37, wherein the first apparatus and the second apparatus that are arranged remotely from each other are capable of performing data communication with each other through a network.

39. A method according to claim 29, wherein each of the first and second apparatuses has at least one of a plurality of functions including a scanner function, a printer function, a copy function, and a facsimile function, or at least two or more of the functions.

40. A method according to claim 29, wherein at least one of the first apparatus and the second apparatus has electronic mail means for transmitting and receiving electronic mails.

41. A method of controlling a system including a second apparatus for receiving a series of data input in one of a plurality of data inputting modes, including a first inputting mode and a second inputting mode, to a first apparatus, from the first apparatus, and for performing a predetermined process based on data forming at least part of the series of data from the first apparatus, the method comprising the steps of:

causing the second apparatus to execute an operation for performing the predetermined process based on the data forming at least part of the series of data from the first apparatus after an inputting process for inputting data required for the predetermined process to be performed in the second apparatus, of the series of data, has been started in the first apparatus when the first apparatus is in the first inputting mode; and causing the second apparatus to execute the operation for performing the predetermined process based on the data forming at least part of the series of data from the first apparatus before the inputting process for inputting the data required for the predetermined process to be performed in the second apparatus, of the series of data, has been started in the first apparatus when the first apparatus is the second inputting mode.

42. A method according to claim 41, wherein when the first apparatus is in the first inputting mode, all data of the series of data are input via an intervening operation executed by an operator in the first apparatus, and wherein the first apparatus is in the second inputting mode, all the data of the series of data are input without the intervening operation being executed by the operator in the first apparatus.

43. A method according to claim 41, wherein when the first apparatus is in the first inputting mode, all data of the series of data are input without using a document feeder for feeding originals of the first apparatus, and wherein when the first apparatus is in the second inputting mode, all the data of the series of data are input using the document feeder of the first apparatus.

44. A method according to claim 41, wherein when the first apparatus is in the first inputting mode, the second apparatus executes the operation for performing the predetermined process based on the data forming at least part of the series of data from the first apparatus after the inputting process for inputting the data required for the predetermined process to be performed in the second apparatus, of the series of data, has been finished in the first apparatus.

45. A method according to claim 41, wherein the predetermined process includes an image forming process for forming an image base on the data forming at least part of the series of data from the first apparatus on a sheet, and wherein the second apparatus executes an operation for performing the image forming process based on the data forming at least part of the series of data from the first apparatus after an inputting process for inputting data required for the image forming process to be performed in the second apparatus, of the series of data, has been started in the first apparatus when the first apparatus is in the first inputting mode, and the second apparatus executes the operation for performing the image forming process based on the data forming at least part of the series of data from the first apparatus before the inputting process for inputting the data required for the image forming process to be performed in the second apparatus, of the series of data, has been started in the first apparatus when the first apparatus is in the second inputting mode.

46. A method according to claim 41, wherein the second apparatus performs an image forming mode selected by an operator from a plurality of image forming modes, including a predetermined image forming mode in which a plurality of images are formed on a single sheet, and further including the steps of determining whether or not the selected image forming mode is the predetermined image forming mode and determining whether or not to cause the second apparatus to execute the operation for performing the predetermined process based on the data forming at least part of the series of data from the first apparatus after the inputting process for inputting the data required for the predetermined process to be performed in the second apparatus, of the series of data, has been started in the first apparatus in accordance with a determining result when the first apparatus is in the first inputting mode, and wherein the second apparatus executes the operation for performing the predetermined process based on the data forming at least part of the series of data from the first apparatus before the inputting process for inputting the data required for the predetermined process to be performed in the second apparatus, of the series of data, has been started in the first apparatus without the image forming mode determining step being executed when the first apparatus is in the second inputting mode.

47. A method according to claim 41, wherein the second apparatus performs an image forming mode selected by an operator from a plurality of image forming modes, including a predetermined image forming mode in which a plurality of images are formed on a single sheet, and wherein when the first apparatus is in the first inputting mode, the second apparatus executes the operation for performing the predetermined process based on the data forming at least part of the series of data from the first apparatus after the inputting process for inputting data required for the predetermined process to be performed in the second apparatus, of the series of data, has been started in the first apparatus when the selected image forming mode is the predetermined image forming mode, and causing the second apparatus to execute the operation for performing the predetermined process based on the data forming at least part of the series of data from the first apparatus before the inputting process for inputting the data required for the predetermined process to be performed in the second apparatus, of the series of data, has been started in the first apparatus when the selected image forming mode is an image forming mode other than the predetermined image forming mode.

48. A method according to claim 47, wherein the predetermined image forming mode includes at least one of an image forming mode in which images are formed on both sides of a sheet, and an image forming mode in which images are on a same side of a sheet, wherein the image forming mode other than the predetermined image forming mode includes at least an image forming mode in which a single image is formed on one side of a sheet.

49. A method according to claim 41, wherein the first apparatus and the second apparatus are arranged remotely from each other.

50. A method according to claim 49, wherein the first apparatus and the second apparatus that are arranged remotely from each other are capable of performing data communication with each other through a network.

51. A method according to claim 41, wherein each of the first and second apparatuses has at least one of a plurality of functions including a scanner function, a printer function, a copy function, and a facsimile function, or at least two or more of the functions.

52. A method according to claim 41, wherein at least one of the first apparatus and the second apparatus has electronic mail means for transmitting and receiving electronic mails.

53. A method of controlling a system including a second apparatus for receiving a series of data input to a first apparatus from the first apparatus, and for performing an image forming process based on data forming at least part of the series of data from the first apparatus in an image forming mode selected by an operator from a plurality of image forming modes, including a predetermined image forming mode in which a plurality of images are formed on a single sheet, and an image forming mode other than the predetermined image forming mode, the method comprising the steps of:

causing the second apparatus to execute an operation for performing the image forming process based on the data forming at least part of the series of data from the first apparatus in an image forming mode selected from the plurality of image forming modes after an inputting process for inputting data required for the image forming process to be performed in the second apparatus, of the series of data, has been finished in the first apparatus when the image forming mode selected from the plurality of image forming modes is the predetermined image forming mode; and causing the second apparatus to execute the operation for performing the image forming process based on the data forming at least part of the series of data from the first apparatus in the image forming mode selected from the plurality of image forming modes before the inputting process for inputting the data required for the image forming process to be performed in the second apparatus, of the series of data, has been finished in the first apparatus when the image forming mode selected from the plurality of image forming modes is the other image forming mode.

54. A method according to claim 53, wherein the second apparatus executes the operation for the image forming process based on the data forming at least part of the series of data from the first apparatus in the image forming mode selected from the plurality of image forming modes before the inputting process for inputting the data required for the image forming process to be performed in the second apparatus, of the series of data, have been started in the first apparatus when the image forming mode selected from the plurality of image forming modes is the other image forming mode.

55. A method according to claim 53, wherein the predetermined image forming mode includes at least one of an image forming mode in which images are formed on both sides of a sheet, and an image forming mode in which images are on a same side of a sheet, wherein the image forming mode other than the predetermined image forming mode includes at least an image forming mode in which a single image is formed on one side of a sheet.

56. A method according to claim 53, wherein the first apparatus and the second apparatus are arranged remotely from each other.

57. A method according to claim 56, wherein the first apparatus and the second apparatus that are arranged remotely from each other are capable of performing data communication with each other through a network.

58. A method according to claim 53, wherein each of the first and second apparatuses has at least one of a plurality of functions, including a scanner function, a printer function, a copy function, and a facsimile function, or at least two or more of the functions.

59. A method according to claim 53, wherein at least one of die first apparatus and the second apparatus has electronic mail means for transmitting and receiving electronic mails.

60. A method of controlling a system including a second apparatus for receiving a series of data input to a first apparatus from the first apparatus, and for performing an image forming process based on data forming at least part of the series of data from the first apparatus in an image forming mode selected by an operator from a plurality of image forming modes, including a predetermined image forming mode in which a plurality of images are formed on a single sheet and an image forming mode other than the predetermined image forming mode, the method comprising the steps of:

causing the second apparatus to execute an operation for performing the image forming process based on the data forming at least part of the series of data from the first apparatus in an image forming mode selected from the plurality of image forming modes after an inputting process for inputting data required for the image forming process to be performed in the second apparatus, of the series of data, has been started in the first apparatus when the image forming mode selected from the plurality of image forming modes is the predetermined image forming mode; and causing the second apparatus to execute the operation for performing the image forming process based on the data forming at least part of the series of data from the first apparatus in the image forming mode selected from the plurality of image forming modes before the inputting process for inputting the data required for the image forming process to be performed in the second apparatus, of the series of data, has been started in the first apparatus when the image forming mode selected from the plurality of image forming modes is the other image forming mode.

61. A method according to claim 60, wherein the second apparatus executes the operation for the image forming process based on the data forming at least part of the series of data from the first apparatus in the image forming mode selected from the plurality of image forming modes after the inputting process for inputting the data required for the image forming process to be performed in the second apparatus, of the series of data, has been finished in the first apparatus when the image forming mode selected from the plurality of image forming modes is the predetermined image forming mode.

62. A method according to claim 60, wherein the predetermined image forming mode includes at least one of an image forming mode in which images are formed on both sides of a sheet, and an image forming mode in which images are on a same side of a sheet, wherein the image forming mode other than the predetermined image forming mode includes at least an image forming mode in which a single image is formed on one side of a sheet.

63. A method according to claim 60, wherein the first apparatus and the second apparatus are arranged remotely from each other.

64. A method according to claim 63, wherein the first apparatus and the second apparatus that are arranged remotely from each other are capable of performing data communication with each other through a network.

65. A method according to claim 60, wherein each of the first and second apparatuses has at least one of a plurality of functions, including a scanner function, a printer function, a copy function, and a facsimile function, or at least two or more of the functions.

66. A method according to claim 60, wherein at least one of the first apparatus and the second apparatus has electronic mail means for transmitting and receiving electronic mails.

67. A control apparatus for controlling a system including a second apparatus for receiving a series of data input in one of a plurality of data inputting modes, including a first inputting mode and a second inputting mode to a first apparatus from the first apparatus and for performing a predetermined process based on data forming at least part of the series of data from the first apparatus, the apparatus comprising:

a controller that causes the second apparatus to execute an operation for performing the predetermined process based on the data forming at least part of the series of data from the first apparatus after an inputting process for inputting data required for the predetermined process to be performed in the second apparatus, of the series of data, has been finished in the first apparatus when the first apparatus is in the first inputting mode, and causes the second apparatus to execute the operation for performing the predetermined process based on the data forming at least part of the series of data from the first apparatus before the inputting process for inputting the data required for the predetermined process to be performed in the second apparatus, of the series of data, has been finished in the first apparatus when the first apparatus is in the second inputting mode.

68. A control apparatus for controlling a system including a second apparatus for receiving a series of data input in one of a plurality of data inputting modes, including a first inputting mode and a second inputting mode to a first apparatus from the first apparatus and for performing a predetermined process based on data forming at least part of the series of data from the first apparatus, the apparatus comprising:

controller that causes the second apparatus to execute an operation for performing the predetermined process based on the data forming at least part of the series of data from the first apparatus after an inputting process for inputting data required for the predetermined process to be performed in the second apparatus, of the series of data, has been started in the first apparatus when the first apparatus is in the first inputting mode, and causes the second apparatus to execute the operation for performing the predetermined process based on the data forming at least part of the series of data from the first apparatus before the inputting process for inputting the data required for the predetermined process to be performed in the second apparatus, of the series of data, has been started in the first apparatus when the first apparatus is in the second inputting mode.

69. A control apparatus for controlling a system including a second apparatus for receiving a series of data input to a first apparatus from the first apparatus and for performing an image farming process based on data forming at least part of the series of data from the first apparatus in an image forming mode selected by an operator from a plurality of image forming modes, including a predetermined image forming mode in which a plurality of images are formed on a single sheet and an image forming mode other than the predetermined image forming mode, the apparatus comprising:

a controller that causes the second apparatus to execute an operation for performing the image forming process based on the data forming at least part of the series of data from the first apparatus in an image forming mode selected from the plurality of image forming modes after an inputting process for inputting data required for the image forming process to be performed in the second apparatus, of the series of data, has been finished in the first apparatus when the image forming mode selected from the plurality of image forming modes is the predetermined image forming mode, and causes the second apparatus to execute the operation for performing the image forming process based on the data forming at least part of the series of data from the first apparatus in the image forming mode selected from the plurality of image forming modes before the inputting process for inputting the data required for the image forming process to be performed in the second apparatus, of the series of data, has been finished in the first apparatus when the image forming mode selected from the plurality of image forming modes is the other image forming mode.

70. A control apparatus for controlling a system including a second apparatus for receiving a series of data input to a first apparatus from the first apparatus and for performing an image forming process based on data forming at least part of the series of data from the first apparatus in an image forming mode selected by an operator from a plurality of image forming modes, including a predetermined image forming mode in which a plurality of images are formed on a single sheet and an image forming mode other than the predetermined image forming mode, the apparatus comprising:

a controller that causes the second apparatus to execute an operation for performing the image forming process based on the data forming at least part of the series of data from the first apparatus in an image forming mode selected from the plurality of image forming modes after an inputting process for inputting data required for the image forming process to be performed in the second apparatus, of the series of data, has been started in the first apparatus when the image forming mode selected from the plurality of image forming modes is the predetermined image forming mode, and causes the second apparatus to execute the operation for performing the image forming process bused on the data forming at least part of the series of data from the first apparatus in the image forming mode selected from the plurality of image forming modes before the inputting process for inputting the data required for the image forming process to be performed in the second apparatus, of the series of data, has been started in the first apparatus when the image forming mode selected from the plurality of image forming modes is the other image forming mode.

* * * * *